United States Patent
Pillai et al.

(10) Patent No.: US 8,874,961 B2
(45) Date of Patent: Oct. 28, 2014

(54) METHOD AND SYSTEM FOR AUTOMATIC FAILOVER OF DISTRIBUTED QUERY PROCESSING USING DISTRIBUTED SHARED MEMORY

(75) Inventors: Brijesh Pillai, Bangalore (IN); Aakanksha Gagrani Singh, Rajasthan (IN); Srikumar Krishnamoorthy, Tamil Nadu (IN)

(73) Assignee: Infosys Limited (IN)

( * ) Notice: Subject to any disclaimer, the term of this patent is extended or adjusted under 35 U.S.C. 154(b) by 680 days.

(21) Appl. No.: 12/789,531

(22) Filed: May 28, 2010

(65) Prior Publication Data

US 2011/0228668 A1 Sep. 22, 2011

(51) Int. Cl.
  *G06F 11/00* (2006.01)
  *G06F 11/20* (2006.01)
  *G06F 17/30* (2006.01)

(52) U.S. Cl.
  CPC ...... *G06F 17/30545* (2013.01); *G06F 11/2023* (2013.01); *G06F 2201/815* (2013.01); *G06F 2201/80* (2013.01); *G06F 11/203* (2013.01); *G06F 11/2043* (2013.01)
  USPC .............................. 714/13; 709/223; 709/224

(58) Field of Classification Search
  USPC .......................................................... 714/13
  See application file for complete search history.

(56) References Cited

U.S. PATENT DOCUMENTS

| | | | |
|---|---|---|---|
| 5,434,994 A * | 7/1995 | Shaheen et al. | 709/223 |
| 6,360,331 B2 | 3/2002 | Vert et al. | |
| 7,055,052 B2 | 5/2006 | Chalasani et al. | |
| 7,093,162 B2 | 8/2006 | Barga et al. | |
| 7,287,179 B2 | 10/2007 | Doyle et al. | |
| 7,689,989 B2 * | 3/2010 | Dostert et al. | 718/100 |
| 7,779,298 B2 * | 8/2010 | Challenger et al. | 714/15 |
| 2004/0068553 A1 * | 4/2004 | Davis et al. | 709/218 |
| 2005/0081097 A1 * | 4/2005 | Bacher et al. | 714/13 |
| 2006/0026219 A1 * | 2/2006 | Orenstein et al. | 707/204 |
| 2006/0130063 A1 * | 6/2006 | Kilian et al. | 718/100 |
| 2006/0143328 A1 * | 6/2006 | Fleischer et al. | 710/19 |
| 2006/0143595 A1 * | 6/2006 | Dostert et al. | 717/127 |
| 2006/0143608 A1 * | 6/2006 | Dostert et al. | 718/1 |
| 2007/0156869 A1 * | 7/2007 | Galchev et al. | 709/223 |
| 2008/0307258 A1 * | 12/2008 | Challenger et al. | 714/20 |
| 2009/0320023 A1 * | 12/2009 | Barsness et al. | 718/100 |
| 2011/0191300 A1 * | 8/2011 | Orenstein et al. | 707/646 |
| 2012/0124100 A1 * | 5/2012 | Schabenberger et al. | 707/802 |

* cited by examiner

*Primary Examiner* — Kamini Patel
(74) *Attorney, Agent, or Firm* — Cantor Colburn LLP (57) ABSTRACT

A method and system for implementing automatic recovery from failure of resources in a grid-based distributed database is provided. The method includes determining the category of each node in the subgroup of nodes, where the determination identifies each node as at least one of a worker node and an idle node. The method further includes saving state of each worker node engaged in execution of a task in a shared memory at pre-determined time intervals. Each worker node is monitored by one or more idle nodes in each sub-group. Upon detection of no change in state of worker node for a pre-determined period of time, a failure notification is raised by one or more idle nodes that have detected failure of the worker node.

11 Claims, 8 Drawing Sheets

METHOD AND SYSTEM FOR AUTOMATIC FAILOVER OF DISTRIBUTED QUERY PROCESSING USING DISTRIBUTED SHARED MEMORY

FIELD OF INVENTION

The present invention relates generally to the field of distributed query processing. More particularly, the present invention provides for recovering automatically from failure of resources in a distributed query processing engine using distributed shared memory.

BACKGROUND OF THE INVENTION

As a consequence of diverse needs of business organizations in the current business scenario, many organizations and companies store their data in varied databases including, but not limited to, transactional databases, data warehouses, business intelligence and legacy systems. In order to access data from such heterogeneous databases, there is a need to integrate the data such that the data is easily and reliably accessible. Data Federation Systems enable seamless, flexible and virtual integration of distributed data sources in an on-demand and real time manner. A data federation system provides an integrated view of data from heterogeneous sources by offering a unified front-end for access to data. Such a system obviates the need for actually moving and copying the data. One of the core components of a data federation system is a Distributed Query Processing (DQP) engine. DQP involves querying distributed data by partitioning a query into several sub-queries and parallelizing their processing over multiple machines.

A basic DQP engine comprises of three main components: Query parser, query optimizer and query evaluation engine. Query parser is configured to perform semantic analysis in order to validate databases, tables and attributes involved in the query. After the parsing of query by the query parser, the query optimizer creates one or more sub-plans and schedules each of the sub-plans on query evaluators. The query evaluators on receiving the sub-plans, evaluates one or more operators specified in the sub-plan and sends the results back to the query optimizer. In case, query execution on any of the evaluator node fails, then the overall query execution stalls and the query has to be re-executed. In real-time computing systems with mission critical performance needs, re-executing the entire query which has been stalled can prove to be very expensive. Since the query has been stalled the first time, the number of resources required for successful execution of the entire query will be twice and the time taken for re-execution will also be twice. As a result, the cost of query execution would be double.

In light of the above, there exists a need for a failure recovery protocol that delivers high performance and high availability so that execution of a failed task is performed efficiently without the need to re-execute it completely.

SUMMARY OF THE INVENTION

A method for implementing automatic recovery from failure of resources in a grid-based distributed database. The grid comprises a plurality of multi-cast subgroup of nodes, where each subgroup of nodes comprises one or more worker nodes and one or more idle nodes. The method includes determining the category of each node in the subgroup of nodes, where the determination identifies each node as at least one of a worker node and an idle node. The method further comprises saving state of each worker node engaged in execution of a task. The state of each worker node is saved in shared memory distributed across nodes in a sub-group at pre-determined time intervals. Each worker node is monitored by one or more idle nodes in each sub-group. The process of monitoring includes polling the shared memory for changes to state of the each worker node at pre-determined time intervals. Upon detection of no change in state of worker node by one or more idle nodes, a failure notification is raised for a pre-determined period of time. Finally, the method includes resuming execution of task of the failed worker node by an idle node selected from amongst the one or more worker nodes.

In an embodiment of the present invention, the task processed by a worker node comprises processing of a query.

In various embodiments of the present invention, implementation of automatic recovery from failure of resources is executed using an OGSA-DQP architecture.

In various embodiments of the present invention, state of worker node saved in distributed shared memory is a checkpoint including a minimal set of data structures required for part of query assigned to a worker node to be re-loaded on another node in order to continue execution of a query.

In an embodiment of the present invention, an idle node selected for resuming the task of the failed worker node is chosen using a lock based agreement scheme. The lock based agreement scheme comprises at least one of Bully algorithm, Coin-flipping protocol and Byzantine protocol.

In an embodiment of the present invention, the distributed shared memory is implemented using software objects. In another embodiment, the distributed shared memory is implemented as associative memory.

In various embodiments of the present invention, the system for implementing automatic recovery from failure of resources includes a State Manager module configured to create, read and invalidate states of worker nodes in a distributed shared memory. The state of a node is the minimal set of required data on which execution of a process is dependent. The system also includes a Fault Detector module operating concurrently with the State Manager module and configured to detect node failures and raise alarms in case of node failures. A Fault Handler module is invoked by the Fault Detector module upon detection of a worker node failure and is configured to trigger the worker nodes to modify their data exchange plan dynamically in response to detection of the worker node failure. The automatic recovery implemented by the system is independent of time of occurrence of failure.

In various embodiments of the present invention, the State Manager module, the Fault Detector module and the Fault Handler module are implemented as software modules in an idle node.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The system and method of the present invention uses a Distributed Shared Memory (DSM) for implementing automatic failover of DQP in a grid environment. The main memory of multiple nodes in the grid is available as a single virtualized memory with single address space. The present invention implements a check-pointing based failure recovery protocol wherein nodes executing query processing periodically save checkpoints in the DSM. In case of failure of an evaluator node, the query execution task is offloaded to another node in the grid. In various embodiments of the present invention, one or more idle nodes may detect failure of an evaluator node and a decentralized agreement scheme is proposed to handle conflicts between the idle nodes with respect to handling of query. The use of DSM leads to faster recovery times as shared memory access costs are very low compared to disk access costs. Further, integration of DSM in the grid improves its scalability, reliability and availability, since the cache memory of each grid node becomes a shared resource.

The present invention would now be discussed in context of embodiments as illustrated in the accompanying drawings.

Figure 1A:
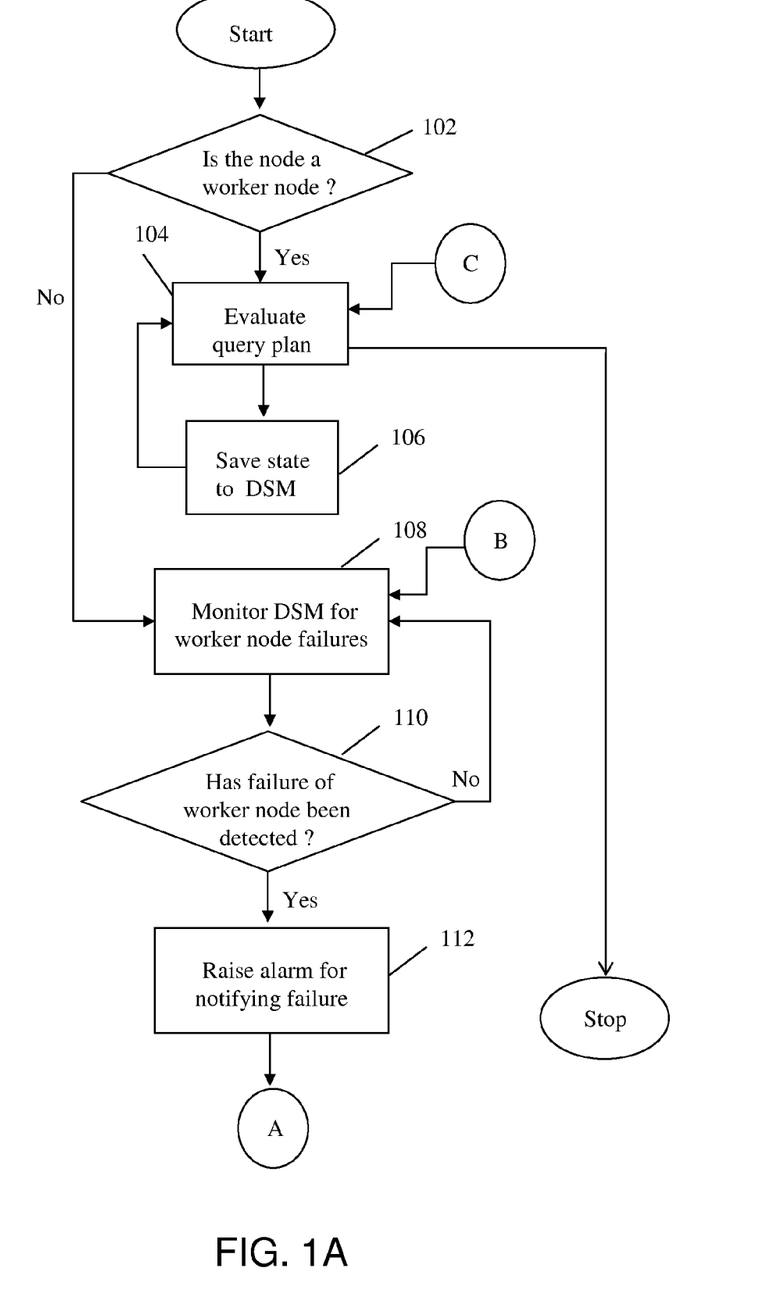
FIGS. 1A and 1B depict a flowchart illustrating method steps for implementing automatic recovery from failure of resources in a Distributed Query Processing (DQP) engine using Distributed Shared Memory (DSM)
Figure 1B:
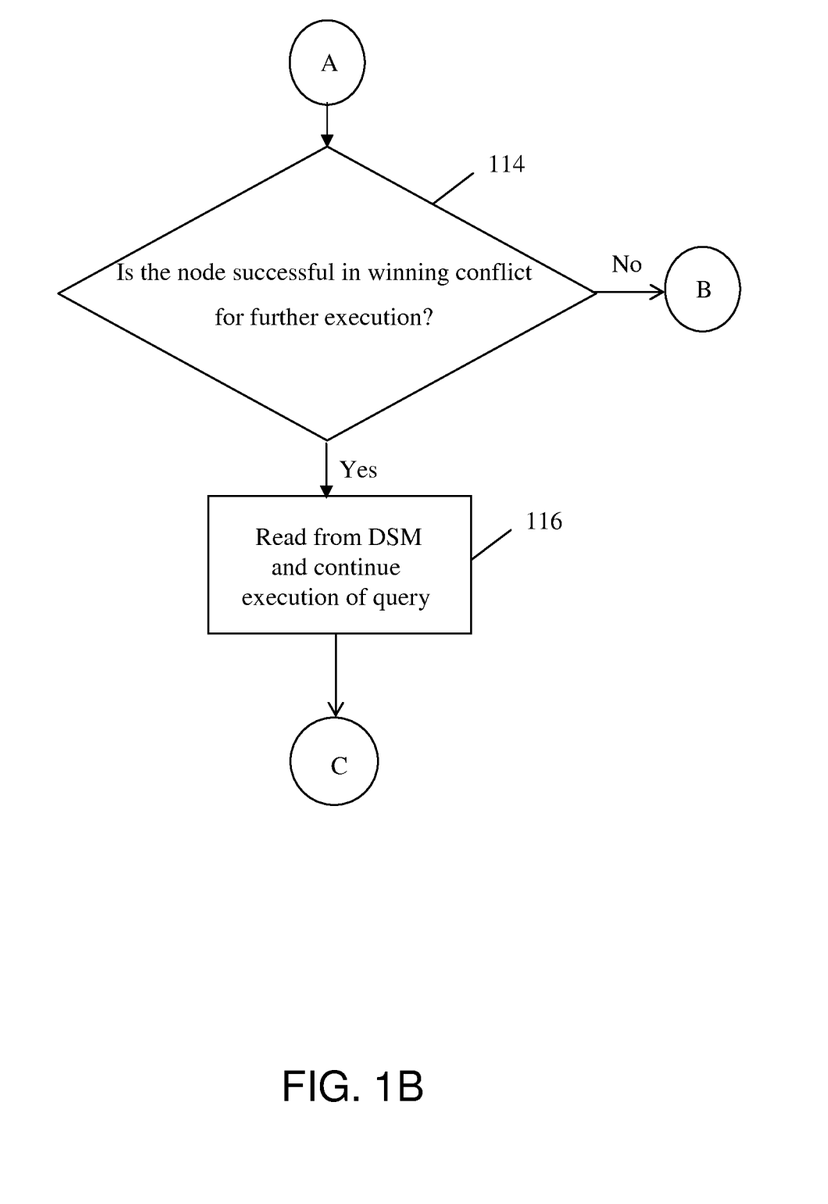

FIG. 1 is a flowchart illustrating method steps for implementing failover in a Distributed Query Processing (DQP) engine using Distributed Shared Memory (DSM). Failover is a fault-tolerant procedure implemented in an automated system for delegating functions of a component task in an automated system in case of failure in completion of the task. Typically, the functions of the component task are delegated to other system components. With respect to a DQP engine used in a data federation system, failover implies enabling recovery from stalling of a query execution on any of the grid nodes due to various reasons. Reasons for failure of grid nodes may include, but are not limited to, operating system crashes, system shutdown, server shutdown, power failure and the like. As is apparent to a person skilled in the art, a DQP engine is adapted to query execution in a grid based data federation system by partitioning the query into several sub-queries and then parallelizing their processing over multiple machines in the grid. The method and system of the present invention attempts to recover from failure of grid nodes by migrating the failed node's task to another node. In order to recover from failure of any grid node, the method and system of the present invention utilizes a check-pointing based failure recovery protocol, wherein resources in the grid are modeled either as worker nodes or idle nodes. The nodes in the grid are randomly partitioned into multiple multi-cast sub-groups. The nodes are partitioned such that there is a uniform distribution of idle nodes among the multi-cast sub-groups. Each multi-cast sub-group comprises one or more worker nodes and one or more idle nodes configured to execute processing of portions of a query. As used herein, the term "worker nodes" includes machines in the grid that have been assigned a specific task to be executed, whereas the term "idle nodes" includes machines that do not have any specific task assigned. For the purposes of this invention, idle nodes are actively involved in monitoring worker nodes and handling failover. In various embodiments, the system and method of the present invention utilizes the concept of distributed shared memory for implementing failover processing. Distributed Shared Memory is a concept wherein a group of networked computers are configured to share a region of virtual memory in order to increase speed and efficiency of memory access. The method steps for failover processing, as illustrated in FIG. 1, includes the following: At step 102, if it is determined that the node is not a worker node, then it can be assumed that the particular node is an idle node. Consequently, the idle node then monitors a distributed shared memory for worker node failures. In an embodiment of the present invention, the idle node monitors multi-cast sub-group of nodes that contains the idle node in the grid. The idle node polls the shared memory within its multi-cast sub-group for changes to the state of a worker node at a frequency $f_{read}$. In order to avoid false alarms, the frequency of reads has to be less than the frequency of writes by worker nodes i.e. $f_{read} < f_{write}$. However, at step 102, if it is determined that the node is a worker node, then at step 104, a query plan is evaluated by the worker node. In an embodiment of the present invention, evaluation of query plan includes execution of the query. After the evaluation of query plan, a snapshot of state of the worker node is saved at step 106. The snapshot of the state is saved in shared memory distributed across nodes in a sub-group containing the worker node. The state of each worker node is saved at fixed time intervals. In an exemplary embodiment of the present invention, the fixed time intervals include, but are not limited to, 1 second, 1.4 seconds, 1.8 seconds and 2.2 seconds. Upon saving of state of worker node at step 106, the worker node continues evaluating the query plan as illustrated by the process flow from step 106 to step 104.

In various embodiments of the present invention, state of a worker node is a checkpoint. The checkpoint includes a minimal set of data structures required for part of query assigned to a worker node to be re-loaded on another node in order to continue execution of a query. As used herein, shared memory distributed among nodes in a sub-group is a virtual address space shared among the nodes. One of the methods for constructing shared memory includes structuring the shared memory using objects. Another method for constructing the shared memory includes structuring the shared memory as associative memory. Thereafter, at step 108, an idle node belonging to the subgroup of nodes including the worker node monitors the worker node for detecting failure.

At step 110, it is determined whether failure of worker node by the idle node has been detected. If no failure is detected, then monitoring of worker nodes by the idle node is continued. However if failure is detected, then at step 112, an alarm is raised for notifying the failure. In an embodiment of the present invention, if there is no change in state of a worker node for a period $$t_{read} = \left(\frac{1}{f_{read}}\right),$$

the idle node raises a failure notification or an alarm.

In various embodiments of the present invention, multiple idle nodes may detect failure of a worker node. In such an instance, a lock based agreement scheme is used to decide which idle node will handle the failover process. Handling the failover process comprises taking on the task of the failed worker node of processing the query. Examples of a lock based agreement scheme may include, but are not limited to, Bully algorithm, Coin-flipping protocol and Byzantine protocol. Since Distributed Shared Memory is used for implementing the failover process, the overhead of implementing message transmissions and locking methods is avoided so that the distributed agreement protocol can be implemented effortlessly. Upon execution of distributed agreement protocol, when a consensus is reached on which particular node will be handling the failover process, execution of query is persisted by the selected idle node. At step 114, it is determined whether the idle node is successful in winning the conflict for handling the failover process. In case, the idle node is unsuccessful in winning the conflict, the idle node then monitors the distributed shared memory for additional worker node failures. However, in case the idle node is successful in winning the conflict, at step 116, the idle node becomes a worker node and resumes execution of the query. Upon beginning of execution of the query, the idle node is converted into worker node and is then monitored by one or more idle nodes within its multi-cast sub-group. In various embodiments of the present invention, other worker nodes within the multi-cast sub-group of the idle node converted into a worker node dynamically modify their data exchange plan in order to accommodate the additional worker node. As explained later, in various embodiments, the system of the present invention uses nodes in OGSA-DQP architecture for implementing the method of failover processing. OGSA is an abbreviation for the open source Open Grid Services Architecture which is a high level data integration service implemented using OGSA-DAI framework. For the purpose of execution of query, the idle node converted into worker node evaluates the query plan. Evaluation of the query plan includes continuing execution of tasks associated with the query plan at the point where the tasks were interrupted as a result of failure.

Figure 2:
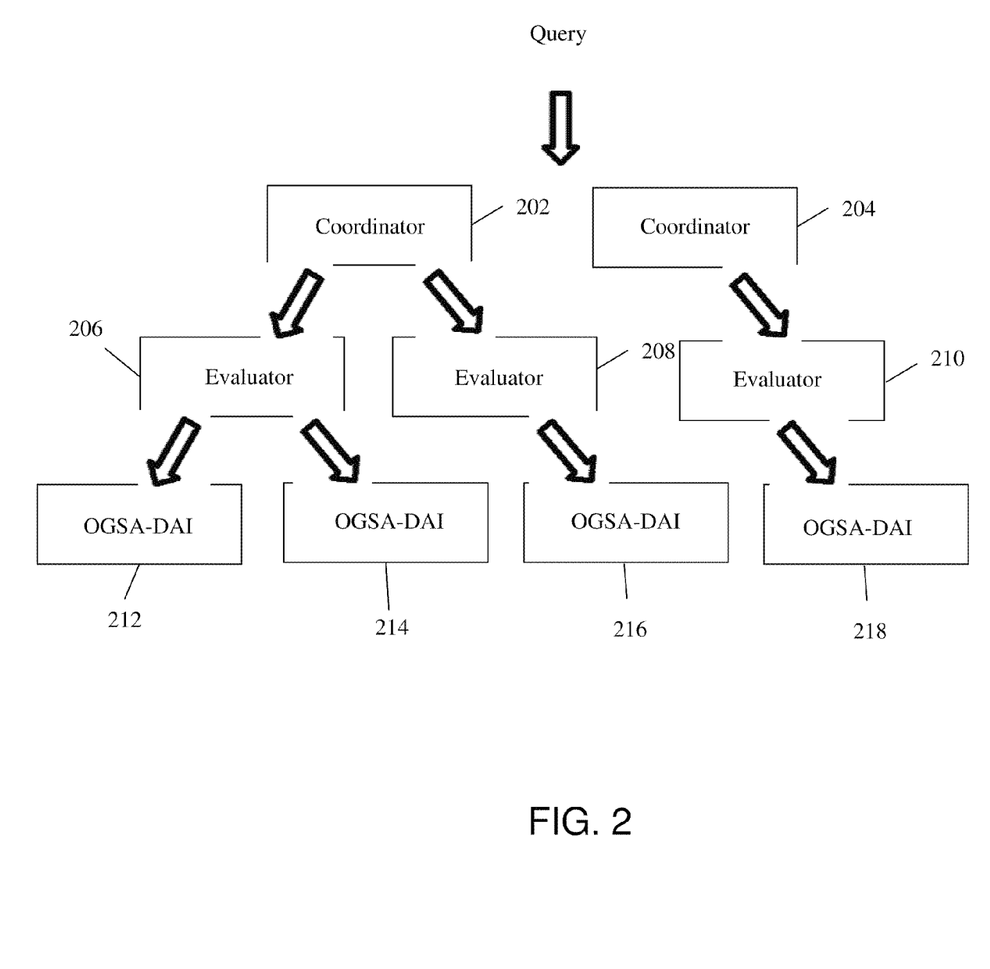
FIG. 2 is a schematic diagram illustrating DQP architecture with OGSA-DAI as an underlying framework used in an embodiment of the present invention for implementing failover processing.

FIG. 2 is a schematic diagram illustrating DQP architecture with OGSA-DAI as an underlying framework used in an embodiment of the present invention for implementing failover processing. With respect to method and system of the present invention, a DQP engine is implemented using a service oriented grid computing architecture such as Open Grid Services Architecture (OGSA). A grid computing architecture involves the use of multiple processors in a grid network for executing applications as services. An example where such architecture can be implemented may include, but is not limited to, data federation systems wherein a single virtual view of distributed data sources is provided to an application. In such an environment, evaluating a query for data includes processing the query by federating it over multiple grid nodes.

OGSA is an open source architecture that enables provision of services in a distributed environment across heterogeneous computer systems. In an embodiment of the present invention, environment for executing queries over distributed databases is simulated using an OGSA-DQP engine. OGSA-DQP is a service framework that is capable of orchestrating services in the grid. Examples of services that can be orchestrated by the grid may include data retrieval services, database services, computational services etc. The orchestration of service such as a query is enabled by parallelizing the query across multiple machines in the grid by specifying machines in the grid as either coordinator nodes or evaluator nodes. As used herein the term "coordinator node" and the term "evaluator node" are equivalent to the term "worker node". Coordinator nodes are configured to take a user query and then compile, optimize, partition and schedule distributed query plans across evaluator nodes, whereas evaluator nodes are configured to execute the query plans. For the purpose of constructing query plans and facilitating their execution the OGSA-DQP engine uses the OGSA-DAI framework as an underlying framework. The OGSA-DAI framework is an extensible framework for data access and integration which can be accessed via web services. The OGSA-DAI framework is typically used in applications for data access, integration, transformation and delivery within a grid, such as a data federation system. With respect to query processing, as shown in the figure, the OGSA-DQP engine provides coordinator nodes 202 and 204 that are configured to receive queries from a client. The DQP engine sets up coordinator nodes to obtain metadata and computational resource information needed to partition and schedule distributed query execution over evaluator nodes 206, 208 and 210. The coordinator nodes 202 and 204 are adapted to create optimal query plans, schedule sub queries and send sub query plans across to the evaluator nodes 206, 208 and 210 for further execution of sub queries.

The evaluator nodes 206 and 208 are configured to execute part of query received from the coordinator node 202. Further, the evaluator node 210 is configured to execute query received from the coordinator node 204. In various embodiments of the present invention, the evaluator nodes use web services for facilitating execution of queries. In an exemplary embodiment of the present invention, the evaluator nodes 206, 208 and 210 are implemented as Simple Object Access Protocol (SOAP) services that are accessible throughout the grid. Further, using web services the evaluator nodes 206, 208 and 210 communicate with each other, exchange information, access databases etc. The OGSA-DAI modules 212, 214, 216 and 218 comprise various web service components for executing activities. Activities are well defined workflow units which are pluggable into OGSA-DAI modules for execution. Examples of activities may include, but are not limited to, executing Structured Query Language (SQL) queries, listing files in a directory, executing an Extensible Stylesheet Language (XSL) transform etc. Examples of web service components include, but are not limited to, Data Request Execution Service (DRES) and Data Request Execution Resource (DRER). In exemplary embodiments of the present invention, the DRER component is configured to parse workflows, execute workflows, build request status and execute number of workflows concurrently. Additionally, the DRES component is used by clients to submit workflows, create sessions, obtain request status of synchronous requests and deliver request status to clients. In various embodiments of the present invention, the explanation in following figures describe the use of OGSA-DQP engine with underlying OGSA-DAI framework for implementing failover using distributed shared memory.

Figure 3:
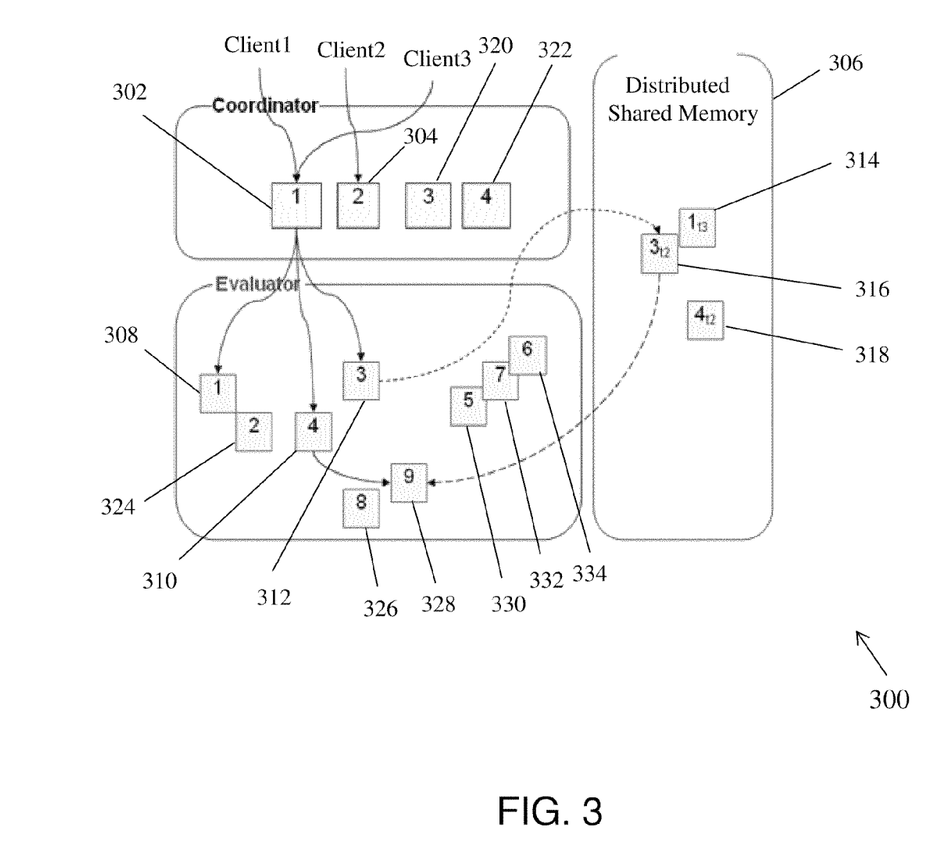
FIG. 3 illustrates processing of queries submitted by multiple clients and handling failover using Distributed Shared Memory, in accordance with an embodiment of the present invention.

FIG. 3 illustrates processing of queries submitted by multiple clients and handling failover using Distributed Shared Memory, in accordance with an embodiment of the present invention. As shown in the figure, clients submit multiple queries to an OGSA-DQP Engine 300. In various embodiments of the present invention, the OGSA-DQP Engine 300 is implemented on multiple grid nodes. The coordinator nodes 302 and 304 of the OGSA-DQP Engine 300 are adapted to receive the queries. In various embodiments of the present invention, the coordinator nodes 302 and 304 are set up to be main points of interaction between clients and the OGSA-DQP Engine. Typically, the coordinator nodes 302 and 304 consist of OGSA-DAI data resources such as DQP Factory data resources and DQP data resources for creating optimal query plans, schedule sub queries and send sub-query plans to the evaluator nodes 308, 310 and 312. Sub-query plans are actually partitions specifying each individual evaluator node's role. The sub-query plans are created by DQP data resources which are dynamically deployed by DQP Factory data resources exposed by the coordinator nodes 302 and 304.

In various embodiments of the present invention, the OGSA-DQP Engine 300 uses Distributed Shared Memory (DSM) 306 for storing checkpoint states corresponding to each step of query execution by evaluator nodes. The Distributed Shared Memory 306 is created using existing nodes in the grid, thereby obviating the need for extra overhead in terms of resources required to implement failover in any application running on the grid. A checkpoint state is the minimal set of data structures required for query to be re-loaded on a different node in order to continue execution of the query, in case of failure. As shown in the figure, during execution of sub query plans by the evaluator nodes 308, 310 and 312, checkpoint states 314, 316 and 318 are stored in the DSM 306 by the evaluator nodes 308, 312 and 310 respectively. The nodes 320, 322, 324, 326, 328, 330, 332 and 334 are idle nodes which are configured to monitor the coordinator nodes and the evaluator nodes and handle failover accordingly. In an embodiment of the present invention, the node 324 monitors the evaluator nodes 308, 310 and 312. Upon failure of node 312, the node 324 detects the failure and requests node 328 to act as node 312. Thereby, the node 328 loads the last check pointed state of node 312, i.e. checkpoint 316 and resumes the operation of node 312.

Figure 4:
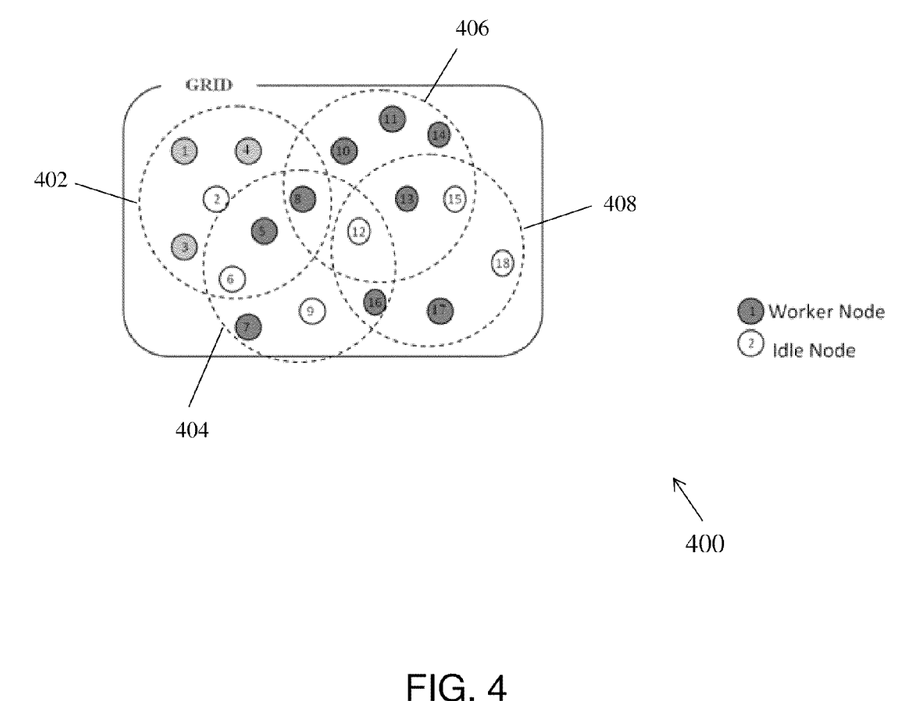
FIG. 4 illustrates a grid comprising multicast sub-groups with worker nodes and idle nodes operating in conjunction to implement failover processing, in accordance with an embodiment of the present invention.

FIG. 4 illustrates a grid 400 comprising multi-cast sub-groups with worker nodes and idle nodes operating in conjunction to implement failover processing, in accordance with an embodiment of the present invention. As shown in the figure, multi-cast sub-groups 402, 404, 406 and 408 comprise worker nodes and idle nodes. In an embodiment of the present invention, the multi-cast sub-group 402 comprises worker nodes 1, 3, 4, 5 and 8 and idle nodes 2 and 6. Similarly, multi-cast sub-group 404 comprises worker nodes 5, 7, 8 and 16 and idle nodes 6, 9 and 12. Further, the multi-cast subgroup 406 comprises worker nodes 8, 10, 11, 13 and 14, and idle nodes 12 and 15. Also shown in the figure, 408 is a multi-cast sub-group comprising worker nodes 13, 16 and 17 along with the idle nodes 12, 15 and 18. As shown in the figure, some worker nodes and idle nodes are part of more than one multi-cast subgroup. Thus, an idle node belonging to a particular multi-cast sub-group may be entrusted with monitoring worker nodes belonging to multiple multi-cast sub-groups. In an embodiment of the present invention, idle node 6 monitors worker nodes 1, 3, 4, 5, 8, 7 and 16. Similarly, idle node 2 monitors worker nodes 1, 3, 4, 5 and 8.

In an exemplary embodiment of the present invention, if worker node 4 fails, idle nodes 2 and 6 come to an agreement over failover. Before coming to an agreement on failover, the idle nodes 2 and 6 raise an alarm in case of failure. In an embodiment of the present invention, the alarm or failure notification is raised and received through the shared memory. A common region in the shared memory which is shared by all the grid members is used to notify failure. All the worker nodes have a listener agent listening for alarm. Hence, when an alarm is raised, all the worker nodes automatically receive the alarm alert.

Idle node 6 wins and transforms itself into node 4. Thus, idle node 6 becomes a worker node and idle node 2 takes on the responsibility of monitoring node 6 in addition to the other nodes. In various embodiments of the present invention, the idle node 6 becoming a worker node comprises loading checkpoint state of node 4 which has been previously stored in a distributed shared memory. Based on the above description, it is evident that failover is integrated into regular operation of a grid without any central authority for monitoring, detecting or handling failure. This helps in eliminating single point of failure and enables practical scale-out architecture.

Figure 5:
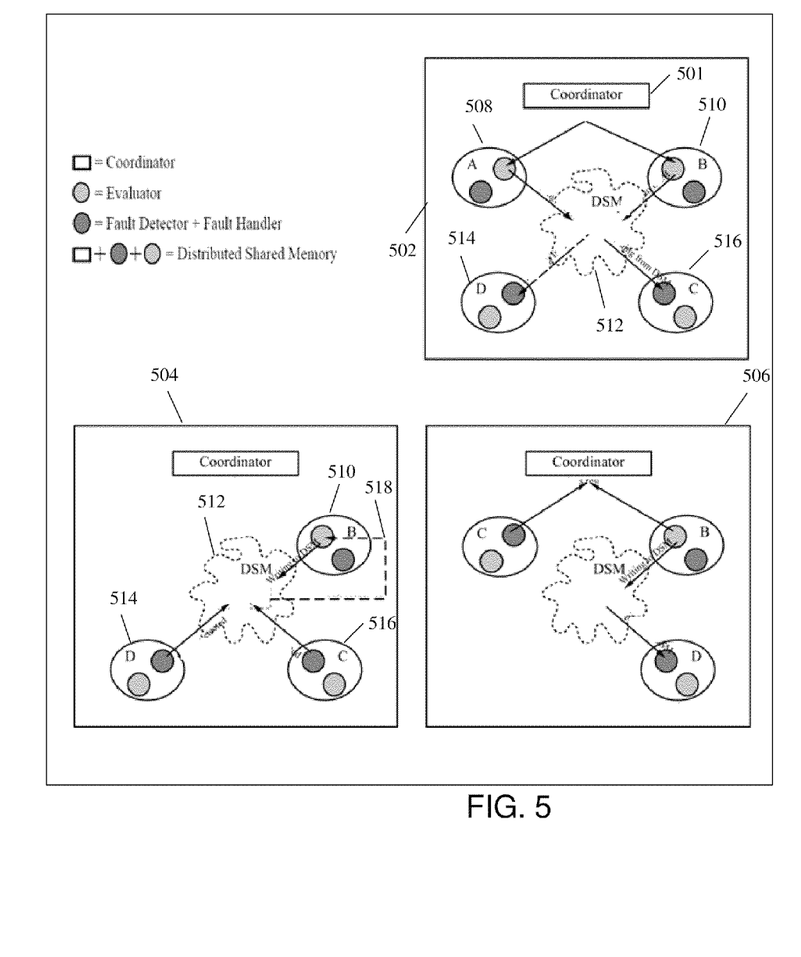
FIG. 5 illustrates steps of failure recovery during query execution, in accordance with an embodiment of the present invention.

FIG. 5 illustrates steps of failure recovery during query execution, in accordance with an embodiment of the present invention. The figure illustrates three steps 502, 504 and 506 of failure recovery during an exemplary query execution. The coordinator node 501 receives a query from the client, creates query sub-plans and then schedules parts of the query to be executed among the evaluator nodes 508 and 510. As shown in step 502, while executing parts of query assigned respectively to them, the evaluator nodes 508 and 510 write system states to a Distributed Shared Memory 512. The idle nodes 514 and 516 are then assigned the task of monitoring the evaluator nodes 508 and 510. Monitoring the evaluator nodes 508 and 510 comprises reading system states written by the evaluator nodes 508 and 510 in the distributed shared memory at fixed intervals of time. In an exemplary embodiment of the present invention, as shown in the figure, the evaluator node 508 fails after performing a TABLE_SCAN operation corresponding to the sub-query plan assigned to it. Thereafter, at step 504, idle nodes 514 and 516 detect failure of the evaluator node 508 and rush to raise an alarm. In an exemplary embodiment, an agreement is reached on handling of failure by the idle node 514. The configuration of present invention is such that the evaluator nodes 508 and 510 automatically receive the alarm alert sent by the idle node 514. Subsequently, as illustrated by the dotted line 518, the evaluator node 510 modifies its plan of exchanging data and thereby exchanges tuples with node 516 instead of the failed node 508. The node 516 now operates as an evaluator (worker) node executing part of query assigned to the failed evaluator node 508. The idle node 514 now takes up the task of monitoring the evaluator nodes 516 and 510.

Figure 6:
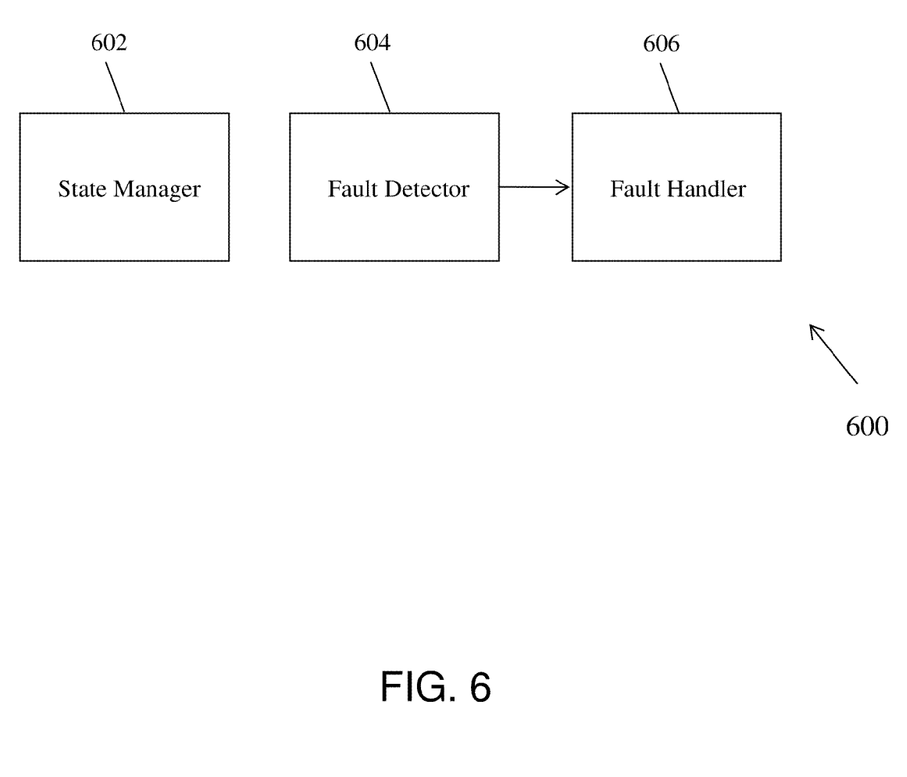
FIG. 6 depicts a schematic diagram showing a system for achieving failover processing, in accordance with an embodiment of the present invention.

FIG. 6 depicts a schematic diagram showing a system 600 for achieving failover processing, in accordance with an embodiment of the present invention. As shown in the figure, protocol for recovering from failure of distributed query processing in a grid environment is implemented using three main recovery modules in a DQP system. As illustrated in the figure, the three main recovery modules are a State Manager 602, a Fault Detector 604 and a Fault Handler 606. In an embodiment of the present invention, the State Manager 602, the Fault Detector 604 and the Fault Handler 606 are embedded as software modules in each idle node. Further, the preceding modules are integrated with DQP engine for facilitating query processing.

The State Manager 602 is primarily configured to create, read and invalidate states in distributed shared memory. State of a node at any time t is the minimal set of entire required data on which current execution process is dependent. State of each node is saved in shared memory distributed over multiple machines in the grid at a frequency f.sub.write. For the purpose of saving state of each node in the shared memory, the state manager module is integrated in DQP engine. Integration of state manager module in DQP engine typically requires minimal modification in the application and is the only part of protocol which is application dependent. Data that comprises the 'state' of a node will depend upon the application requirement. For example, if an application A does not need any data to recover from failure, then the application A's state could be null entity. In another example, an application B may only need to know the time of failure to recover from failure. In this case, the application B's state could be a timestamp.

The Fault Detector 604 is a module that operates concurrently with the State Manager 602 and is configured to detect faults and raise alarms in case of node failures. In an embodiment of the present invention, idle nodes monitor worker nodes within its multi-cast sub-group for failure. Monitoring includes polling shared memory for changes to the state of worker nodes at frequency $f_{read}$. In order to avoid false alarms, the frequency of reads has to be lesser than the frequency of writes i.e. $f_{read} < f_{write}$. In case there are no changes to state of a worker node for a period $t_{read} = (1/f_{read})$, the fault detector 604 raises an alarm on the worker node. In some instances, when an active worker node leaves the distributed shared memory, the active worker node is also reported and categorized as a candidate for failure. In various embodiments of the present invention, multiple idle nodes monitoring a worker node may raise alarms and then the idle nodes raising alarms come to a mutual consensus for handling failure using a distributed agreement protocol. The failure notification is raised and received through shared memory. A common region in the shared memory, shared by all grid members is used to notify failure. In an embodiment of the present invention, all the worker nodes comprise a listener agent listening for alarm. Hence when the alarm is raised, all the worker nodes automatically receive the alarm alert. The system 600 further comprises a fault handler module 606. The fault handler module is invoked by the fault detector 604, in case of a worker node failure. Once the fault handler 606 is invoked, the evaluator and worker nodes modify their exchange plan dynamically to take care of data exchange among the evaluators. The fault detector 604 fetches the last saved state of failed node from the distributed shared memory (cache), loads it into its own memory and resumes operation.

In various embodiments of the present invention, the system 600 implements a recovery protocol such that the time required to recover from failure is independent of the time at which the failure occurs. The following analysis validates the preceding statement:

Let Q=query executed on a distributed query processing engine.

T=Time taken to execute query Q without failover implementation.

$T_n$=Time taken to execute query Q after each of n failures.

T'=Time taken to execute query Q with failover checkpointing without failures $T'_n$=Time taken to execute query Q with failover checkpointing with n failures Let each of the n failures (i=1 . . . n) occur at time $t_i$ such that $t_{i-1} < t_i < T$ and $t_o = 0$; Assuming that no overhead is associated with re-execution after each failure, $$T_n = T + \Sigma_{i=1}^{n} t_i \quad (1)$$

As described earlier, the state manager in our recovery protocol check-points the state at an interval $t_{write}$ and the fault detector polls for failure at an interval $t_{read}$. In order to avoid false failure alarms, the following equation holds:

$$t_{write} \ll t_{read} \quad (2)$$

Let a single failure occur at time $t_1$ such that $0 < t_1 < T$. The fault detector will detect failure at a time $t_{detect}$, where:

$$t_1 < t_{detect} < t_1 + t_{read} \quad (3)$$

In an embodiment of the present invention, the fault handler takes a constant time τ to come to an agreement to reload the check-pointed state and to continue execution. τ can be determined empirically depending on the last checkpointing time period. Let $t_{saved}$ denote the last saved checkpoint:

$$t_1 - t_{write} < t_{saved} < t_1 \quad (4)$$

On a pessimistic note from 3 and 4 let, $$t_{detect} = t_1 + t_{read}$$

$$t_{saved} = t_1 - t_{write}$$

Now, time taken for execution after a single failure:

$$T'_1 = t_{detect} + \tau + (T' - t_{saved}) \quad (5)$$
$$= t_1 + t_{read} + \tau + (T' - (t_1 - t_{write}))$$
$$= T' + t_{write} + t_{read} + \tau$$

Similarly, for i=2 . . . n we have $$T'_i = T'_{i-1} + t_{write} + t_{read} + \tau \quad (6)$$

Deriving for n failures $$T'_n = T' + n \times (t_{write} + t_{read} + \tau) \quad (7)$$

From the above equations, it is evident that the time taken for recovering from failures is independent of time $t_i$ at which failure occurred.

From equations 1 and 7, gain due to failover is illustrated by the following equation:

$$T_n - T'_n = (\Sigma_{i=1}^{n} t_i) - n \times (t_{write} + t_{read} + \tau) + (T - T') \quad (8)$$

Experimental simulations using Distributed Shared Memory prove failover implementation overhead T−T' to be negligible.

Thus, gain due to failover is illustrated by the following equation:

$$= (\Sigma_{i=1}^{n} t_i) - n \times (t_{write} + t_{read} + \tau) \quad (9)$$

It can be derived that for a single failure, gain due to failover $$= t_1 - (t_{write} + t_{read} + \tau) \quad (10)$$

Figure 7:
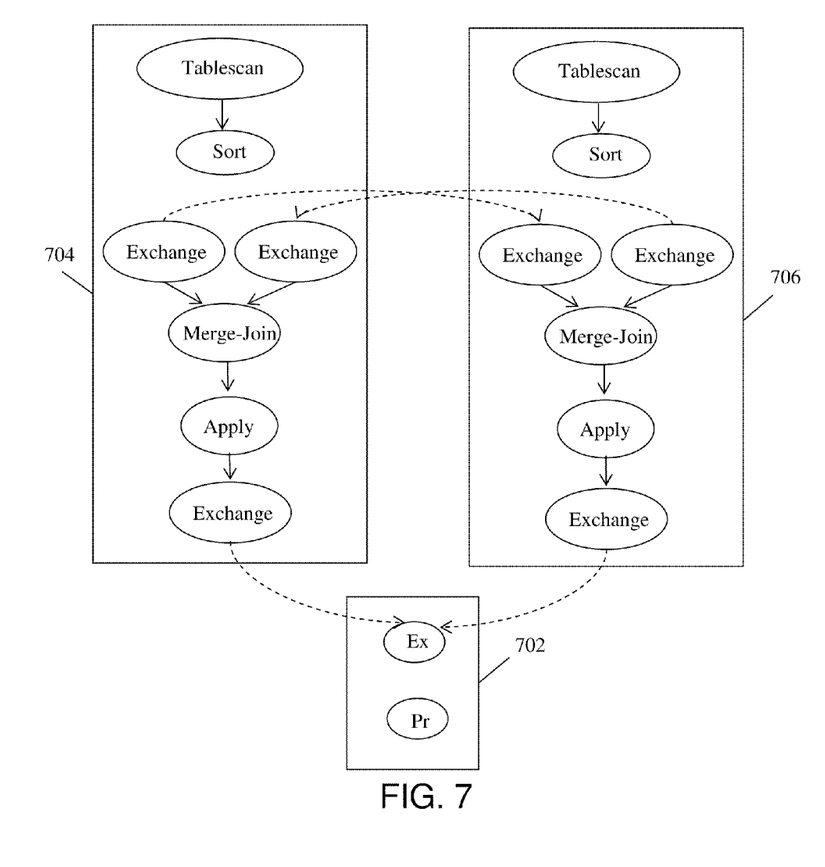
FIG. 7 illustrates execution of a query by a DQP engine using distributed shared memory, in accordance with an embodiment of the present invention.

FIG. 7 illustrates execution of an exemplary query that joins results from two databases and implements the query using Distributed Shared Memory. The method and system of the present invention uses a DQP engine with an SQL query that is provided as an input to a coordinator node 702. In an exemplary embodiment of the present invention, the SQL query to be executed joins tuples from "Dproducts" database which is a DB2 database and from "BMProducts" database which is a MYSQL database based on a condition. As shown in the figure, the coordinator node 702 generates a query plan for the query and schedules sub queries among the evaluator nodes 704 and 706. Further, the coordinator node 702 is also responsible for assigning tasks of monitoring evaluator nodes to nodes termed as idle nodes. As demonstrated in the description of FIG. 6, an idle node is primarily involved in executing the tasks of fault detection and fault handling. In an embodiment of the present invention, the coordinator node 702 assigns the task of fault detection to idle nodes or regular computation to evaluator nodes on the basis of dynamic statistics like memory available, processor speed of a particular resource etc. The evaluator nodes 704 and 706 execute the sub queries using the operators TABLESCAN, SORT, EXCHANGE, MERGE-JON and APPLY. TABLESCAN operator fetches tuples from database as per sub-query provided by the coordinator node. SORT operator does a bubble sort of the tuples on the JOIN attribute, whereas the EXCHANGE operator exchanges tuples between the evaluator nodes 704 and 706. In an embodiment of the present invention, the MERGE-JOIN operator implements a merge-join on the received tuples for joining the tuples in order to obtain a concatenated result. The APPLY operator is adapted to filter joined tuples as per the query and EXCHANGE operators send joined tuples back to the coordinator node 702.

The system and method of the present invention comprises a state manager, which is a thread that gets invoked after regular time intervals and stores system states of each evaluator node in distributed shared memory. In an embodiment of the present invention, the system state comprises a state object which consists of the following objects: a) An OPERATOR object which is an instance of CLASS operator i.e. it contains local variables, tuples fetched or exchanged and name of operator at the instance of time when the tuples are fetched, b) Time Stamp c) Evaluator Internet Protocol (IP) address d) Coordinator IP e) sub-query plan f) session identifier. The above mentioned state object comprises, in an embodiment of the present invention, the minimum set of data structures required for continuing execution of a sub-query on a separate node. As described earlier in the application, storing system states in a DSM facilitates use of system states by an idle node, when the idle node appropriates sub query processing task of the evaluator node in case of failure of the evaluator node. Optimal configuration of DSM plays a vital role in optimizing the recovery protocol. The DSM provides high availability by replicating the data on multiple nodes which are part of DS cluster. For maximum availability, the replication is optimized by replicating the data on minimal nodes. In various embodiments, the DSM can be configured for full replication for faster recovery from failure.

The present invention can be used to process queries by multiple clients. Processing of queries by multiple clients is facilitated by using a separate identifier for each session of processing. Further, the system and method of the present invention is configured to handle multiple evaluator node failures. In an embodiment, the present invention can also be applied for enabling recovery of coordinator nodes. In an embodiment of the present invention, only the definition of a state would change to extend the implementation for recovery of coordinator modules. The variables and objects that signify the state of a coordinator will form the state of the node in the State Manager module.

The present invention may be implemented in numerous ways including as a system, a method, or a computer readable medium such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A method for implementing automatic recovery from failure of resources in a grid-based distributed database, the grid comprising a plurality of multi-cast subgroup of nodes, wherein each subgroup of nodes comprises one or more worker nodes and one or more idle nodes, the method comprising:
   determining a category for each node in the subgroup of nodes, wherein each node is categorized as a worker node or an idle node;
   saving a set of data structures corresponding to each step involved in execution of a task assigned to each worker node at pre-determined time intervals in a shared memory distributed across the sub-group of nodes, wherein the saved set of data structures is assigned a first value;
   monitoring each worker node by the one or more idle nodes in each sub-group by polling the shared memory for detecting changes to the saved set of data structures corresponding to each worker node at pre-determined time intervals, wherein a second value is assigned to the saved set of data structures corresponding to each worker node if a change is detected;
   raising a failure notification by the one or more idle nodes if the second value is not detected after a pre-determined period of time for at least one of the worker nodes, wherein the detection of no change from the first value to the second value indicates interruption in the execution of at least one of the steps involved in the execution of the task, thereby the saved set of data structures acts as a checkpoint for determining the saved set of data structures that are to be reloaded to the one or more idle nodes;
   reloading the saved set of data structures corresponding to each step involved in execution of the task of the at least one worker node to at least one of the one or more idle nodes after the detection of no change from the first value to the second value; and
   resuming, by the idle node, execution from the interrupted step involved in the execution of the task.

2. The method of claim 1, wherein the second value is greater than the first value.

3. The method of claim 1, wherein the task executed by the worker nodes comprises processing of a query.

4. The method of claim 3, wherein the implementation of automatic recovery from failure of resources is executed using an OGSA-DQP architecture.

5. The method of claim 1, wherein the step of reloading comprises selecting the idle node from the one or more idle nodes using a lock based agreement scheme.

6. The method of claim 5, wherein the lock based agreement scheme comprises at least one of Bully algorithm, Coin-flipping protocol and Byzantine protocol.

7. The method of claim 1, wherein the distributed shared memory is implemented using software objects.

8. The method of claim 1, wherein the distributed shared memory is implemented as associative memory.

9. A system for implementing automatic recovery from failure of resources in a Distributed Query Processing (DQP) engine implemented in a grid-based distributed database, wherein the grid comprises one or more worker nodes configured to execute a query and one or more idle nodes configured to monitor the one or more worker nodes, the system comprising:

a processor having:

a State Manager module configured to save a set of data structures corresponding to each step involved in execution of a task assigned to each worker node at pre-determined time intervals in a distributed shared memory, wherein the saved set of data structures is assigned a first value; and         a Fault Detector module operating concurrently with the State Manager module and configured to:

monitor each of the worker nodes by polling the distributed shared memory for detecting changes to the saved set of data structures corresponding to each worker node at pre-determined time intervals, wherein a second value is assigned to the saved set of data structures corresponding to each worker node if a change is detected, detect node failure in the event of no change from the first value to the second value, raise alarms in case of node failure, wherein the node failure indicates interruption in the execution of at least one of the steps involved in the execution of the task, thereby the saved set of data structures acts as a checkpoint for determining the saved set of data structures that are to be reloaded to the one or more idle nodes reload the saved set of data structures corresponding to each step involved in execution of the task of the at least one worker node to at least one of the one or more idle nodes after the detection of node failure, and     resume execution by the idle node from the last interrupted step involved in the execution of the task.

10. The system of claim 9, wherein the automatic recovery implemented is independent of time of occurrence of failure.

11. The system of claim 9, wherein the State Manager module and the Fault Detector module are implemented as software modules in each of the idle nodes.

* * * * *